United States Patent [19]
Montjoy et al.

[11] Patent Number: 5,951,024
[45] Date of Patent: Sep. 14, 1999

[54] ENHANCED GRIP TOOL HOLDING CHUCK

[75] Inventors: Kenneth M. Montjoy, Seneca; Mark S. Huggins, Clemson, both of S.C.; Roger J. Kanaan, Dayton, Ohio

[73] Assignee: Power Tool Holders Incorporated, Wilmington, Del.

[21] Appl. No.: 08/909,343

[22] Filed: Aug. 11, 1997

[51] Int. Cl.⁶ .................................................. B23B 31/20
[52] U.S. Cl. ..................... 279/43; 279/43.2; 279/46.3; 279/50; 279/75; 279/904
[58] Field of Search ................ 279/42, 43, 43.1–43.4, 279/46.1–46.3, 47–53

[56] References Cited

U.S. PATENT DOCUMENTS

| | | |
|---|---|---|
| Re. 31,755 | 12/1984 | Wanner et al. |
| 668,286 | 2/1901 | Freese ........................... 279/43 |
| 761,501 | 5/1904 | Kimball et al. ................ 279/42 |
| 1,227,632 | 5/1917 | Lagerback . |
| 1,265,707 | 5/1918 | Berglund . |
| 1,353,299 | 9/1920 | Wilson . |
| 1,636,421 | 7/1927 | Knott . |
| 2,807,473 | 1/1957 | Kiehne . |
| 2,843,388 | 7/1958 | Butler et al. |
| 2,860,883 | 11/1958 | Better et al. |
| 2,926,020 | 2/1960 | Dayton et al. |
| 3,070,380 | 12/1962 | Holmberg . |
| 3,172,676 | 3/1965 | Kern, Jr. ......................... 279/51 |
| 3,521,895 | 7/1970 | Smith . |
| 3,727,928 | 4/1973 | Benjamin . |
| 3,816,015 | 6/1974 | Bilz et al. |
| 3,863,940 | 2/1975 | Cummings ..................... 279/50 |
| 4,395,051 | 7/1983 | Tonomura . |
| 4,513,980 | 4/1985 | Kruse . |
| 4,525,111 | 6/1985 | Gutsche . |
| 4,570,952 | 2/1986 | Heimbigner et al. |
| 4,599,019 | 7/1986 | Ueberall et al. |
| 4,692,073 | 9/1987 | Martindell . |
| 4,721,423 | 1/1988 | Kubo . |
| 4,799,838 | 1/1989 | Kubo et al. |
| 4,808,049 | 2/1989 | Cook . |
| 4,867,463 | 9/1989 | Hopf . |
| 4,902,177 | 2/1990 | Burnett . |
| 4,989,887 | 2/1991 | Jordan . |
| 5,096,212 | 3/1992 | Walsh . |
| 5,193,824 | 3/1993 | Salpaka . |
| 5,301,961 | 4/1994 | Wozar . |
| 5,464,229 | 11/1995 | Salpaka . |
| 5,810,366 | 9/1998 | Montjoy ..................... 279/43 |

FOREIGN PATENT DOCUMENTS

| | | |
|---|---|---|
| 510876 | 1/1955 | Italy ............................... 279/50 |
| 31516 | 3/1980 | Japan . |
| 587871 | 5/1947 | United Kingdom . |

OTHER PUBLICATIONS

U.S. Patent application Serial No. 09/067,569.
U.S. Patent application Serial No. 08/808,890

*Primary Examiner*—Steven C. Bishop
*Attorney, Agent, or Firm*—Dority & Manning

[57] ABSTRACT

A tool holding device for holding a tool bit to a drive spindle includes a body member having an axially extending bore defined therein for receipt of a tool shank. The body member includes a plurality of axially extending segments defining the bore. The segments are defined by axially extending slits in the body member. The slits extend from a front face of the body member rearward. The segments are radially compressible to grip upon a tool shank inserted into the bore when a radially compressive force is applied to the segments in the area of the slits. The bore defined by the segments has a tapered diameter that is greater at the front face of the body member and tapers to a lesser diameter in the axially rearward direction.

15 Claims, 5 Drawing Sheets

ENHANCED GRIP TOOL HOLDING CHUCK

BACKGROUND OF THE INVENTION

The present invention relates to an improvement in a tool holding device or chuck that includes a plurality of radially compressible tool gripping segments separated by axial slits in a body member of the chuck device.

The industry is continuously seeking improvements in tool holding chuck devices that will substantially increase the gripping strength or slip torque of such devices without substantially increasing the manufacturing cost or complexity of the devices.

The industry is also turning towards a type of chuck device referred to as a "quick-change" chuck wherein a tool bit can be readily inserted and removed from the chuck by manipulation of a sleeve member or other actuating device without the necessity of wrenches or other tools. With particular types of these chucks, the tool shank is inserted into a bore defined by segments in the chuck body. The segments are separated by axial slits. A compressive force is applied to the segments to compress or flex the segments radially inward to grip upon the tool shank. Examples of this type of chuck device are contained in U.S. patent application Ser. No. 08/808,890 filed on Feb. 28, 1997, by the assignee of this application. Embodiments of the chucks described and disclosed in the pending '890 application will also be discussed in this application.

The importance of increasing gripping strength or slip torque is of particular concern in high speed machine applications, such as routers, dry wall cutters, laminate trimmers, etc. An improved chuck device for use in these applications is disclosed and claimed in the pending '809 application cited above. The present invention has particular relevance to these chucks in that it substantially increases the gripping strength and slip torque of the chucks without adding to the manufacturing process or cost.

OBJECTS AND SUMMARY OF THE INVENTION

It is therefore a principal object of the present invention to provide an improved chuck device that substantially increases gripping strength and slip torque without adding to the manufacturing cost or complexity of the device.

Additional objects and advantages of the invention will be set forth in part in the following description, or may obvious from the description, or may be learned through practice of the invention.

In accordance with the objects and purposes of the invention, a tool holding device, such as a chuck, is provided for holding a tool bit to a drive spindle of a power tool. The precise type of power tool, or intended application of the tool, is not of particular relevance to the present invention. The tool holding device or chuck includes a body member having an axially extending bore defined therein for receipt of a tool shank. The body member includes a plurality of axially extending segments which define the bore. The segments are defined by slits in the body member which extend axially rearward from a front face of the body member. The segments are compressible radially inward to grip upon a tool shank inserted into the bore.

The chuck includes means for radially compressing the segments upon actuation of the device so that the segments will grip and hold a tool shank inserted into the bore. The means for radially compressing can comprise any manner of mechanism or device. For example, the means may include an axially movable sleeve member that moves an engaging member, such as balls, into and out of axial ramps defined on the outer circumference of the body member segments. Alternatively, circumferentially defined ramps may be defined on the body member with actuating members, such as balls, being movable along the circumferential ramps by rotation of a actuating sleeve member. Alternatively, a levered centrifugal actuating device could be utilized to apply a compressive force to the segments. Also, a ball screw or spring mechanism may be utilized to apply the compressive force. Any and all such combinations of compressive force devices within the level of knowledge of those skilled in the art and come within the scope and spirit of the present invention.

The bore defined by the segments is tapered in diameter from a greater diameter at the forward face of the body member to a smaller diameter at the rearward end of the bore. Applicants have found that this tapered bore substantially increases the gripping strength and slip torque of the identical chuck without the tapered bore. The tapered bore does not add any substantial cost to the manufacturing process yet provides a significant increase in the efficiency of the chuck, as will be discussed in greater detail herein.

The segments in the body member are connected at a common point to the body member and flex radially inward at a pivot point that is axially rearward of the slits at the location where the slits join the body member. This pivot point is axially rearward of the end of a tool shank that is inserted into the bore. The smallest diameter of the tapered bore is also axially forward of the pivot point. For a chuck having a 0.500 inch capacity, applicants have determined that a preferred taper is in the range from 0.002 to 0.004 inches over an axial length of the bore of about 0.625 inches. As will be discussed in greater detail below, applicants believe that the tapered bore actually produces a magnification of the compressive force applied to the segments at an axial position forward of the pivot point near the smaller diameter section of the bore. This magnification results in a gripping strength far greater than that applied by the same compressive force with a straight or uniform axial bore.

It should be understood that the description of the present device, particularly the tapered bore, contained herein with reference to one particular type of chuck is only for illustrative purposes. The tapered bore concept according to the invention can be utilized in any chuck or tool holding device wherein a compressive radial force is applied to tool gripping segments that pivot or flex radially inward about a pivot or flex point that is axially rearward of the point of applied compressive force. Any and all such variations of tool holding chucks or devices is within the scope and spirit of the invention.

DETAILED DESCRIPTION OF THE PREFERRED EMBODIMENTS

Figure 1:
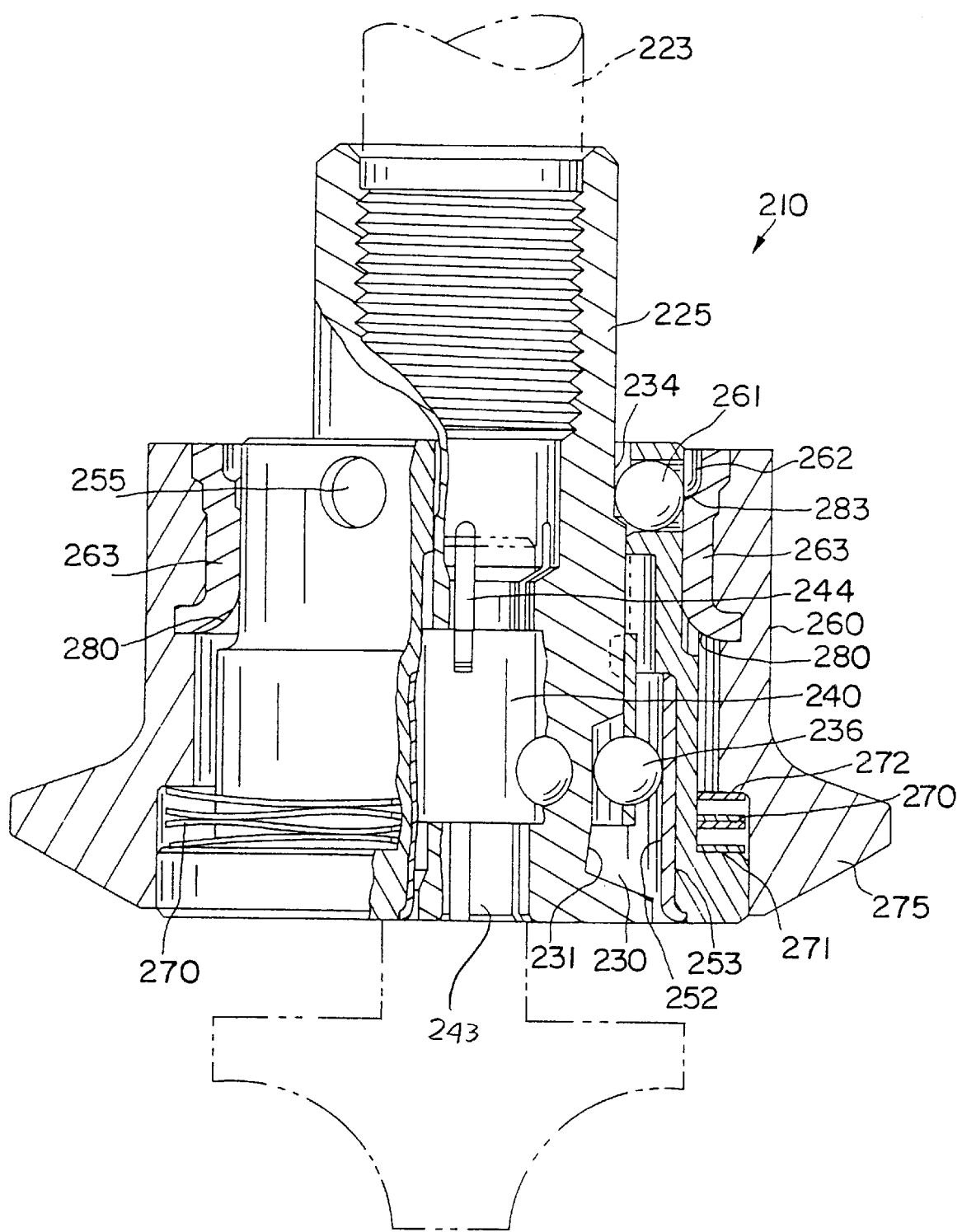
FIG. 1 is a longitudinal cross-sectional view of an embodiment of the chuck device according to the invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment may be used on another embodiment to yield still a further embodiment. The present application covers such modifications and variations as come within the scope and spirit of the invention.

The present invention relates to tool holding device or chuck with a uniquely designed tapered bore, particularly a quick-change chuck device, wherein a plurality of longitudinally extending segments define an axial bore for receipt of a tool shank. The segments are defined by axially extending slits and are joined to the body member at their end. Although described below with regards to one particular type of chuck device, it should be understood that the description and figures are only meant to illustrate and describe one embodiment of the invention, and the present invention is not limited to any particular type of tool, chuck, or working environment.

Also, the particular mechanism for mounting the chuck to a machine or power tool is not of critical importance to the invention. For example, the device may be threadedly engaged to a spindle 223 of the machine tool by way of a female threaded section of body 225, as particularly illustrated in FIG. 1. Alternatively, a male threaded section may be defined on the body member 225. Alternatively, the chuck device may be configured as an insert device which is insertable into a receiving socket of a drive spindle. In another embodiment, the chuck device may be held by a conventional set screw, or threaded retaining screw. Alternatively, a tapered mount and screw assembly may be used, as commonly understood by those skilled in the art. It should be appreciated that any conventional mounting mechanism or means is applicable to the present inventive chuck device.

One particular type of chuck device which incorporates the present inventive tapered bore concept is illustrated in FIGS. 1 through 4. The operation of this particular chuck device will be described in detail below before reference is made in detail of the inventive tapered bore concept.

The quick change chuck device 210 according to the illustrated embodiment includes a body member 225 defining a central longitudinal axis 221 and a bore 220 defined therein for receipt of a circular tool shank. Body member 225 includes a plurality of axially extending slits 244 extending from a front end or face of the body member towards a back end of the body member. Slits 244 define axially extending segments 243. Accordingly, segments 243 are radially compressible upon a tool shank inserted into bore 220.

A gripping sleeve member 250 is disposed coaxially about body member 225 and is axially movable relative to the body member. Gripping sleeve member 250 is axially movable between a gripping or locked position as illustrated in FIG. 1, to a release position illustrated in FIG. 3.

A cam element channel or pocket 230 is defined between an axially flat surface 252 of gripping sleeve member 250 and an axially sloped surface 231 of body member 225. In the embodiment illustrated, the axially flat surface 252 is defined by a metal insert 253 carried by gripping sleeve member 250. The axially sloped surface 231 is defined in body member 225 adjacent an axially flat surface 233. Thus, it should be understood, that cam element channel or pocket 230 defines a first section with a first radial dimension and a second section with a reduced second radial dimension which is less than that of the first radial dimension. In the embodiment illustrated, the radial dimension of channel 230 at the first section which includes the axially sloped surface 231 is greater than the radial dimension of the second section which includes the axially flat surface 233.

A cam element, such as the plurality of rolling balls 236, is movable within channel 230 by axial movement of the gripping sleeve member 250. Cam elements 236 are preferably carried in a cage member 240. Applicants have found that twelve rolling balls 236 is particularly suitable. In the gripping or locked position illustrated in FIG. 1, cam elements 236 are located in the second section of cam element channel 230 having the reduced radial dimension. In this position, cam elements 236 radially compress segments 243 of body member 225 defined by axial slits 244. Radial compression of this portion of body member 225 causes the segments defined by slits 244 to radially compress and grip a tool shank inserted into bore 220.

Upon axially forward movement of gripping sleeve member 250, cam elements 236 are moved axially forward into the first section of cam element channel 230 having the greater radial dimension. This position of cam elements 236 is particularly illustrated in FIG. 3. In this position, the segments of body member 225 defined by axial slits 244 are allowed to radially expand at least to an extent so that they release the tool shank carried in bore 220.

Figure 3:
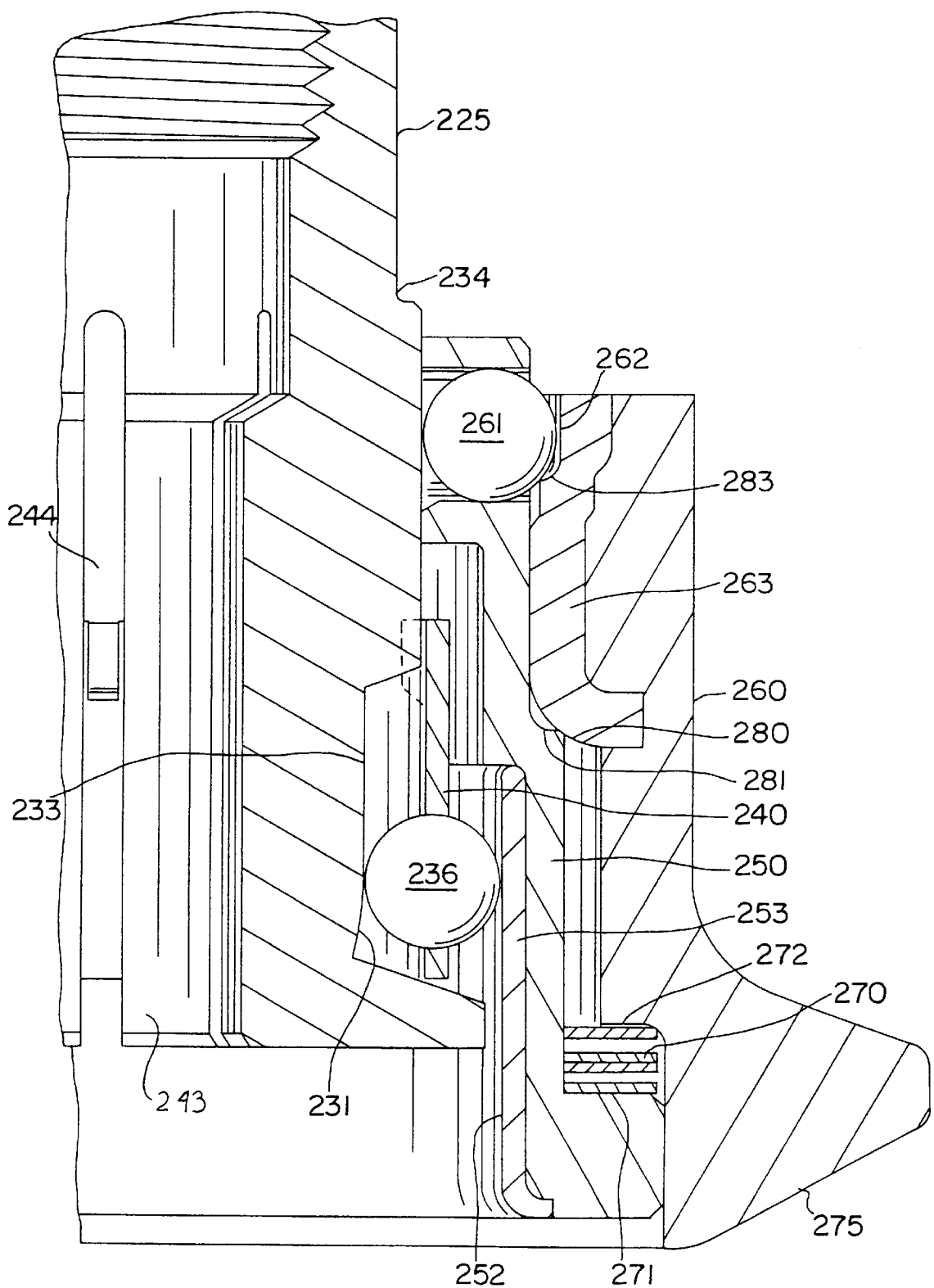
FIG. 3 is an enlarged partial cross-sectional view of the chuck device shown in FIG. 1.
Figure 4:
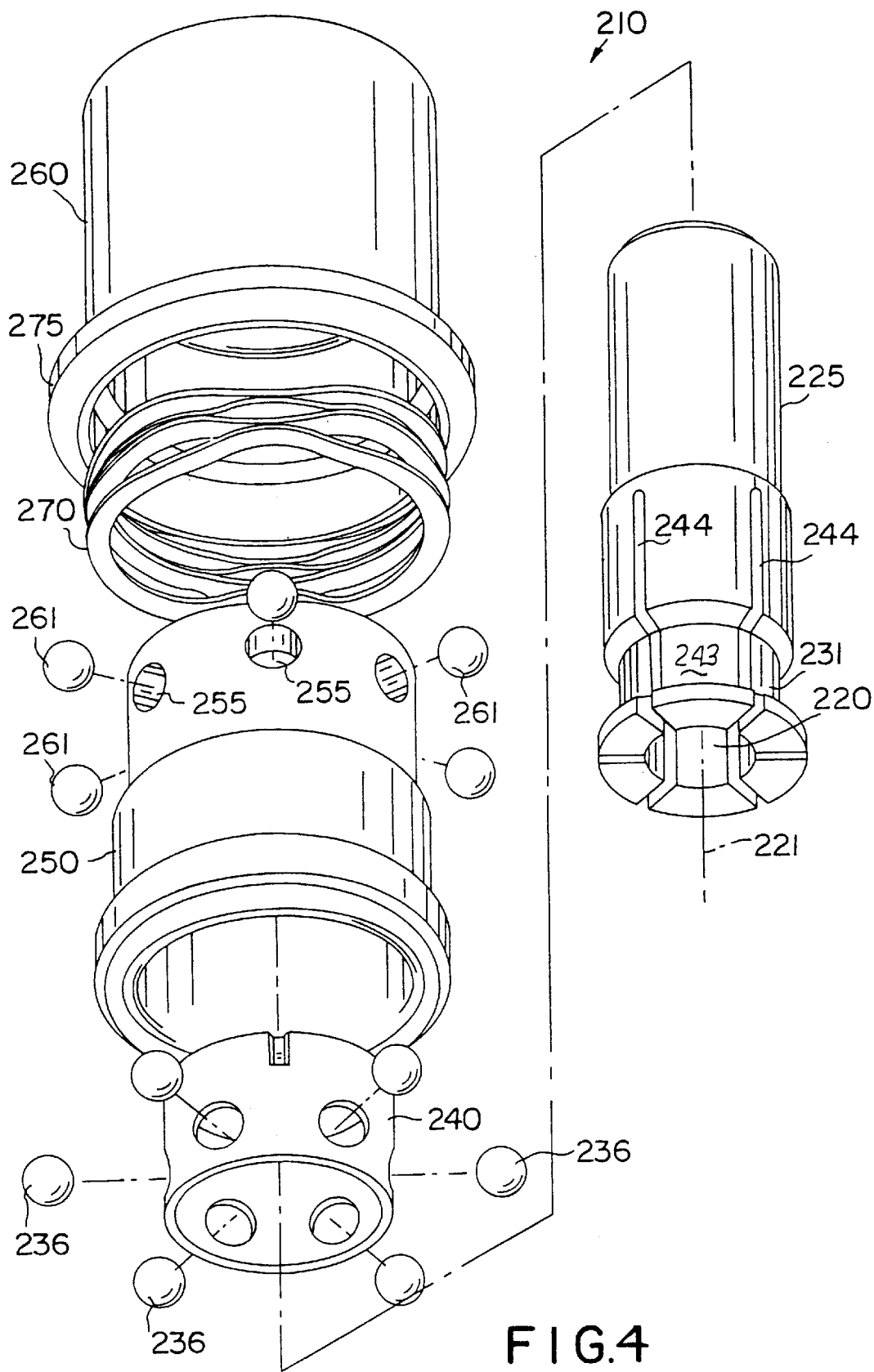
FIG. 4 is an in-line assembly view of the chuck device illustrated in FIG. 1.

Cam elements 236 are axially moved within cam element channel 230 through frictional rolling engagement with the axially flat surface 252 of metal insert 253 and rolling contact with surfaces 233 and 231 of body member 225. Frictional contact is still maintained between cam elements 236 and surfaces 252, 231 even when the elements 236 are in the greater radial dimension section of pocket 231, as illustrated in FIG. 3, so that cam elements 236 can be frictionally moved back into the gripping position as illustrated in FIG. 1.

Chuck device 210 also includes a locking sleeve member 260 for manual actuation of gripping sleeve member 250. Locking sleeve member 260 extends coaxially relative to gripping sleeve member 250 and includes an annular flange 275 for manual grasping thereof. A spring element 271, such as a conventional wave spring, is disposed between opposing surfaces 271 of gripping sleeve member 250 and 272 of locking sleeve member 260. Thus, the two sleeve members are axially biased away from each other and chuck device 210 is biased in the gripping or locked position.

Chuck device 210 also includes a locking element to maintain the device in the gripping or locked position. In the embodiment illustrated, the locking element includes rolling bodies 261 carried in locking channels 255 formed in gripping sleeve member 250. A locking recess 234 is defined in body member 225 and rolling bodies 261 reside in this locking recess in the gripping position of the device, as illustrated in FIG. 1. Locking sleeve member 260 includes a metal insert 263. Insert 263 includes a locking surface 262 generally radially opposite from locking recess 234 in the release position. In the gripping position of the device as illustrated in FIG. 1, locking surface 262 extends axially rearward beyond rolling bodies 261 so that an axially flat section of insert 263 contacts bodies 261 and maintains these bodies in locking recess 234. This arrangement prevents axially forward movement of gripping sleeve member 250 until locking surface 262 of insert 263 is disposed radially opposite rolling bodies 261.

Metal insert 263 includes a shoulder 280 defined on the forward end thereof. As will be explained shortly, shoulder 280 cooperates with a shoulder 281 defined on gripping sleeve member 250 to move the gripping sleeve member in the axially forward direction.

Figure 2:
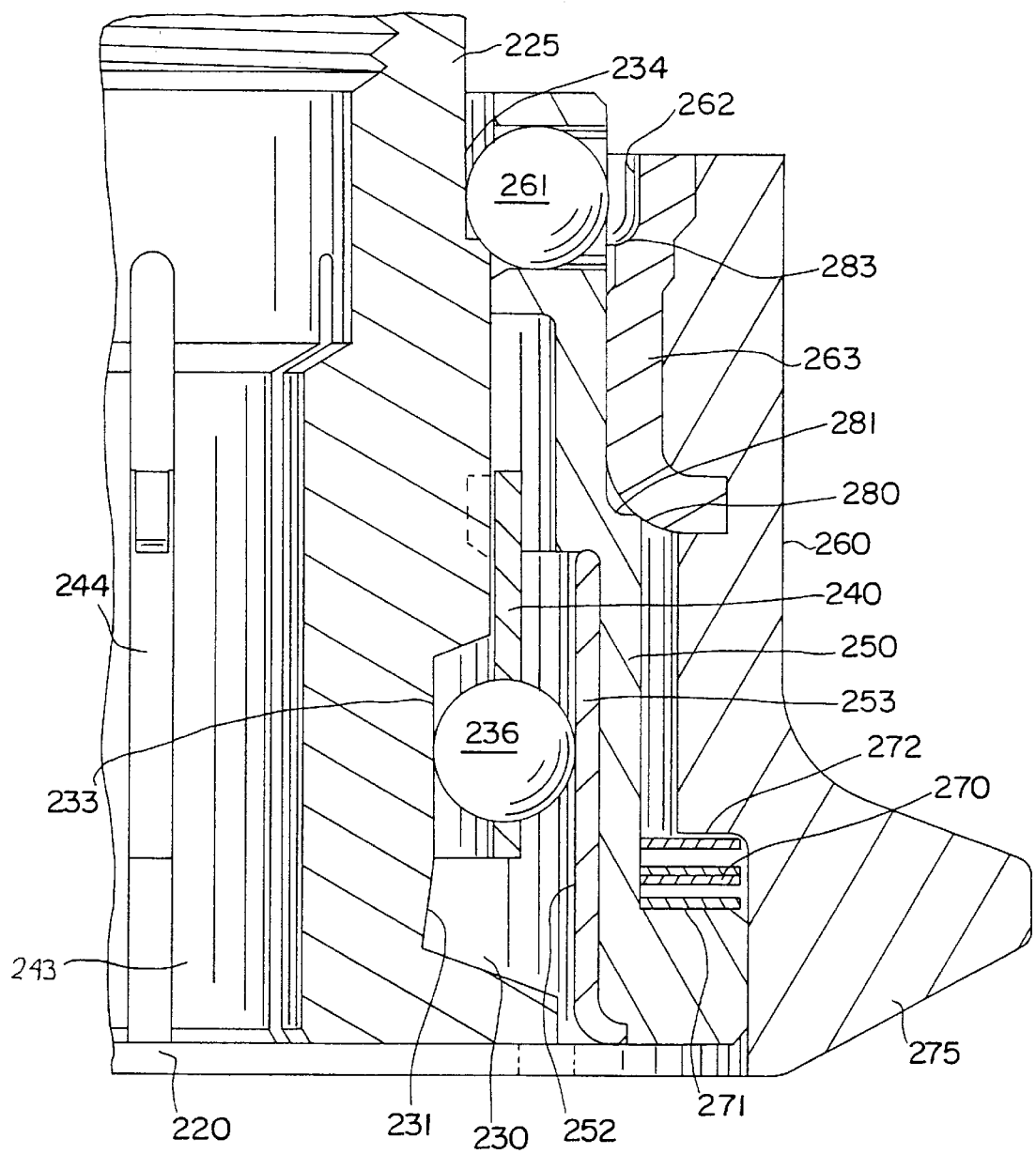
FIG. 2 is an enlarged longitudinal cross-sectional view of the chuck device shown in FIG. 1.

To move the device from the gripping position illustrated in FIG. 1 to the release position illustrated in FIG. 3, an operator grasps annular flange 271 of locking sleeve member 260 and pulls the locking sleeve member axially forward against the force of spring mechanism 270. Referring particularly to FIG. 2, locking sleeve member 260 is pulled axially forward until locking surface 262 of metal insert 263 is radially opposite rolling bodies 261. At the same time, shoulder 280 of metal insert 263 comes into contact with shoulder 281 of gripping sleeve member 250 and further forward movement of locking sleeve member 260 causes rolling bodies 261 to move radially outward into the space defined by locking surface 262, which further allows for gripping sleeve member 250 to be moved axially forward along with locking sleeve member 260. Movement of gripping sleeve member 250 in the axially forward direction causes cam elements 236 to be rolled also axially forward due to the frictional engagement between surfaces 252, 233, and 231. Cam elements 236 move axially forward into the section of cam element channel 230 defined by the axially sloped surface 231 of body member 225. This configuration is illustrated particularly in FIG. 3. In this position, the segments of body member 225 defined by axial slits 244 are allowed to move radially outward to such an extent that they release upon a tool shank inserted into bore 220. In this configuration, the operator simply removes the tool from chuck device 210.

In order to insert and lock a tool into the device 210, the operation is simply reversed. Chuck device 210 is in the configuration illustrated in FIG. 3 and a tool shank is inserted into bore 220. The operator then pushes the locking sleeve member 260 axially rearward which causes the gripping sleeve member 250 to also be moved axially rearward by engagement of a shoulder 283 of metal insert 263 with rolling bodies 261 until rolling bodies 261 move into locking recess 234 defined on body member 225, as illustrated in FIG. 2. Once rolling bodies 261 have moved into recess 234, locking spring member 260 will then move axially rearward independent of gripping sleeve member 250 until the axially flat section of insert 263 locks rolling bodies 261 in locking recess 234, as illustrated in FIG. 1.

As the locking sleeve member 260 and gripping sleeve member 250 are moved axially rearward in the operation just described, cam elements 236 within cage 240 are frictionally moved axially rearward into the second section of cam element channel 230 having the reduced radial dimension. In this position, cam elements 236 cause radial compression of the segments of body member 225 defined by axial slits 244 causing the segments to grasp upon the tool shank inserted into bore 220.

Figure 5:
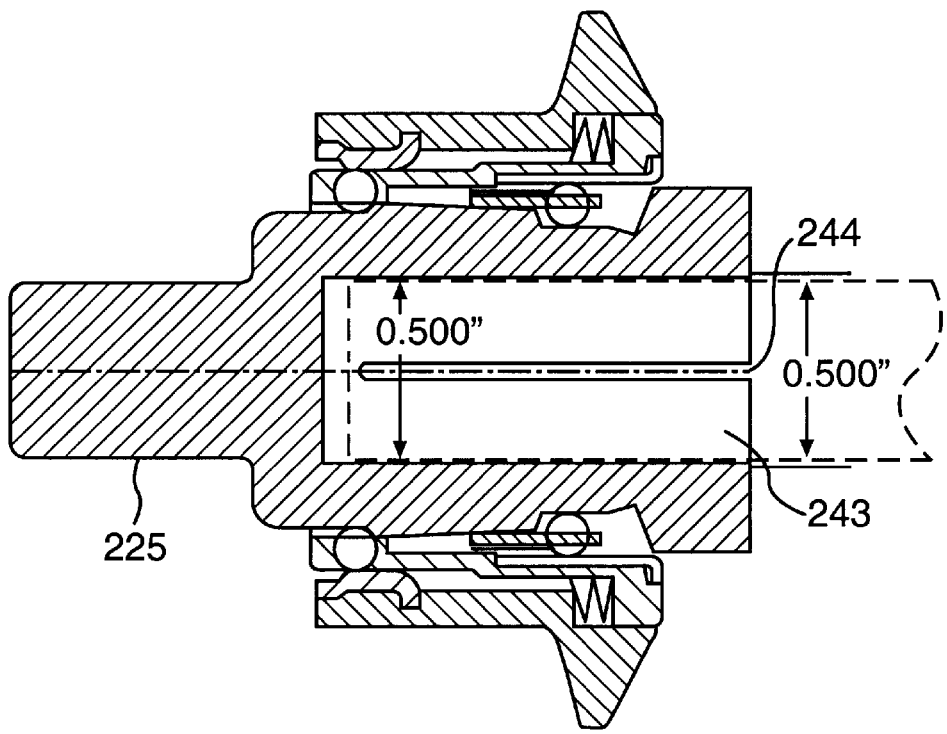
FIG. 5 is a diagrammatic conceptual view of the operating principal of the tapered diameter bore according to the invention.
Figure 6:
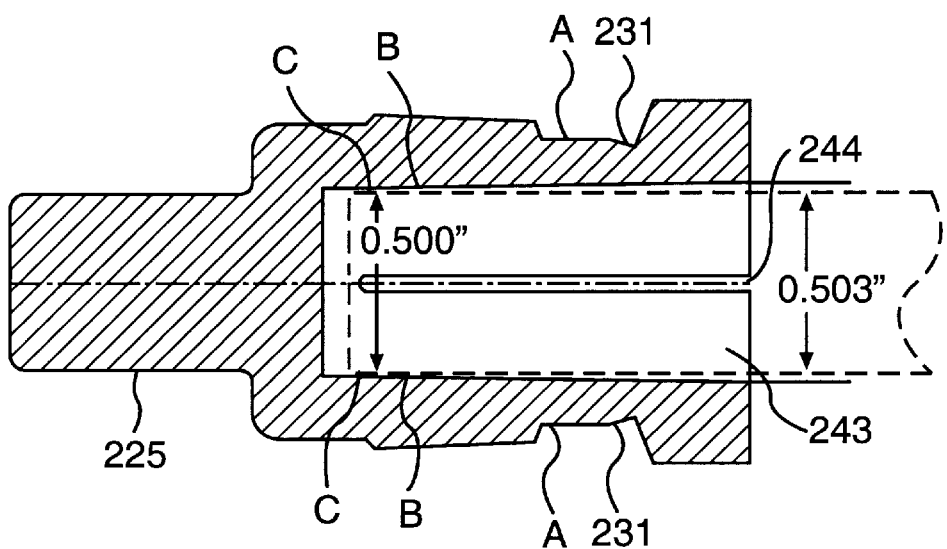
FIG. 6 is a diagrammatic view particularly illustrating the tapered bore concept according to the invention.

As described above, the bore 220 defined by segments 243 for receipt of the tool shank is tapered from its forward end at the front face of body 225 to its axially rearward end. This concept is particularly illustrated in FIGS. 5 and 6. FIGS. 5 and 6 illustrate a quick-change chuck with a capacity of 0.500 inches. FIG. 5 illustrates the device in its clamping or gripping condition upon a tool shank. In this compressed state, the bore diameter is constant at 0.500 inches. FIG. 6 illustrates just the body member 225 with segments 243 in their uncompressed or relaxed state. It can be seen in FIG. 6 that the bore has a diameter of about 0.503 inches at the front face of body 225 and tapers to about 0.500 inches at an axial position corresponding essentially to the end of slits 244. For a 0.500 inch capacity chuck, applicants have found that a preferred taper is in the range of from about 0.002 to 0.004 inches over an axial length of about 0.625 inches from the front face of the bore to the rear end of the bore. However, it should be understood, that any range of tapers is within the scope and spirit of the invention, and also that the degree of taper may vary depending on the chuck capacity.

Although not wishing to be held to the theory expressed herein, applicants believe that the taper causes an amplification of the gripping or radially compressing force at the axially rearward position of the bore. For example, referring to FIG. 6, the point of radial compression applied by balls 236 is indicated at position A on the ramp section 231. It is at this point that the radial compressive force of balls 236 is a maximum, as illustrated in FIGS. 1 and 2. When the radial force is applied to segments 243, they tend to pivot or flex generally at point C at a position axially rearward of the end of slits 244. At point B generally near the end of slits 244, the bore 220 has a diameter essentially the same as the tool shank to be held and there is thus an initial point of contact or near-contact close to point B. Applicants believe that the taper generates a lever or moment arm between the point of applied radial force A and pivot or flex point C, and that this moment arm magnifies the compressive force at point B far greater than the compressive force that would exist at point B if the bore has a constant uniform diameter. Applicants have tested the 0.500 inch capacity chuck device illustrated in FIGS. 5 and 6 with and without a tapered bore. The embodiment without the tapered bore had a gripping torque of from about 30 to 35 inch-lbs. The same capacity chuck with the tapered bore had a slip torque of about 65 to 75 inch-lbs, nearly a 100 percent increase in the gripping strength. Applicants believe that the substantial increase in gripping strength is a result of the magnification of the gripping force at the rearward end of the tool shank, generally at point B. In fact, applicants believe that a uniform constant bore may actually result in a less overall gripping strength when the compressive force is applied generally near the front face or forward end of the bore. This may be a result of the fact that the pivot or flex point for the segments is axially rearward of the tool shank and thus radially inward movement of the forward end of the segments may actually cause the rear end of the segments to tend to lift off of the tool shank as the forward end is compressed radially inward. This potential problem is eliminated, and the gripping strength significantly increased, by defining the bore with a taper, as described herein.

It should be understood by those skilled in the art that the tapered bore concept according to the present invention can be utilized in any manner of tool holding device or chuck wherein the lever action is generated. For example, it is within the scope and spirit of the invention to incorporate a tapered bore in a collet device wherein the gripping segments of the collet are joined at one end through a continuous member. The invention has application in any device wherein the radial compressive force is applied to one end of axially defined gripping segments that are joined at a common end and which, thus, tend to pivot or flex at the common end.

Thus, it should be recognized by those skilled in the art that various modifications and variations of the invention can be made and utilized without departing from the scope and spirit of the invention, and particularly that the inventive tapered bore can be utilized in any number of tool holding or chuck devices. It is intended that the present application cover such modifications and variations as come within the scope of the appended claims and their equivalents.

What is claimed is:

1. A tool holding device for holding a tool bit to a drive spindle of a power tool, comprising:

a body member having an axially extending bore defined therein for receipt of a cylindrical tool bit shank, said body member comprising a plurality of axially extending segments defining said bore, said segments defined by slits in said body member extending axially rearward from a front face of said body member, said segments being radially compressible to grip upon a tool shank inserted into said bore;

means for radially compressing said segments upon actuation of said device so that said segments grip and hold a tool shank inserted into said bore; and said bore defined by said segments comprising a tapered diameter that is greater at said front face of said body member and tapers to a lesser diameter in the axially rearward direction, said taper being defined such that as said segments are compressed radially inward contact is established initially and maintained between said segments and the tool bit shank generally at an axially rearward end of said slits.

2. The device as in claim 1, wherein said segments flex radially inward at a point axially rearward of said slits where said segments are joined to said body member, said point defining a pivot point for said segments, said pivot point being axially rearward of an axial end of a tool shank inserted into said bore.

3. The device as in claim 2, wherein a least diameter of said tapered bore is at a point axially forward of said pivot point.

4. The device as in claim 3, wherein said bore defines an initial point of contact with a tool shank inserted therein at said least diameter in an uncompressed state of said segments.

5. The device as in claim 1, wherein said bore tapers in a range of generally from 0.002 to 0.004 inches over an axial length of about 0.600 inches.

6. The device as in claim 1, further comprising an axially movable sleeve member configured to actuate said means for radially compressing said segments.

7. The device as in claim 6, further comprising a means for locking said sleeve member.

8. The device as in claim 1, further comprising means for operably connecting said device to a drive spindle of a power tool.

9. The device as in claim 1, wherein said body member is formed integral with a drive spindle of a power tool.

10. The device as in claim 1, wherein said device is a chuck mountable to a drive spindle of a power tool.

11. The device as in claim 1, wherein said means for compressing said segments applies a radially inward force to said segments at a point axially closer to said front face of said body member relative to an axial rearward end of said slits.

12. A chuck device for holding a cylindrical tool bit shank to a drive spindle of a power tool, comprising:

a body member having an axially extending bore defined therein for receipt of a tool bit shank, said body member comprising a plurality of axially extending segments defining said bore, said segments defined by slits in said body member extending axially rearward from a front face of said body member, said segments flexible radially inward at a point axially rearward of an end of said slits;

means for actuating said chuck to radially compress said segments at an axial position forward of said flex point; and said bore defined by said segments comprising a tapered diameter that tapers from a larger diameter at said front face of said body member to a smaller diameter at said end of said slits, said taper being defined such that as said segments are compressed radially inward contact is established initially and maintained between said segments and the tool bit shank generally at an axially rearward end of said slits.

13. The chuck as in claim 12, wherein said means for actuating comprises a movable sleeve member.

14. The chuck as in claim 13, wherein said sleeve member is axially movable.

15. The chuck as in claim 12, further comprising means for mounting said chuck to a drive spindle of a power tool.

* * * * *